US012132701B2

(12) United States Patent
Sam et al.

(10) Patent No.: US 12,132,701 B2
(45) Date of Patent: Oct. 29, 2024

(54) DISCOVERING SERVICES ACROSS NETWORKS BASED ON A MULTICAST DOMAIN NAME SYSTEM PROTOCOL

(71) Applicant: Arista Networks, Inc., Santa Clara, CA (US)

(72) Inventors: Dennis Sam, Santa Clara, CA (US); Xiaohui Gong, Santa Clara, CA (US); May Louie, Burnaby (CA); Hyun Chul Chung, Leander, TX (US)

(73) Assignee: ARISTA NETWORKS, INC., Santa Clara, CA (US)

( * ) Notice: Subject to any disclaimer, the term of this patent is extended or adjusted under 35 U.S.C. 154(b) by 4 days.

(21) Appl. No.: 17/705,251

(22) Filed: Mar. 25, 2022

(65) Prior Publication Data

US 2023/0308413 A1  Sep. 28, 2023

(51) Int. Cl.
*H04L 61/4511* (2022.01)
*H04L 45/00* (2022.01)
*H04L 61/5069* (2022.01)
*H04L 67/51* (2022.01)

(52) U.S. Cl.
CPC .......... *H04L 61/4511* (2022.05); *H04L 45/66* (2013.01); *H04L 61/5069* (2022.05); *H04L 67/51* (2022.05)

(58) Field of Classification Search
CPC . H04L 61/4511; H04L 45/66; H04L 61/5069; H04L 67/51
USPC ................................. 709/203, 226–229, 245
See application file for complete search history.

(56) References Cited

U.S. PATENT DOCUMENTS

| | | | |
|---|---|---|---|
| 9,130,859 B1* | 9/2015 | Knappe | H04L 12/1886 |
| 9,516,097 B1* | 12/2016 | Ishvarchandra | H04L 67/51 |
| 11,683,287 B2* | 6/2023 | Warrick | H04L 61/4511 709/224 |
| 11,985,038 B2* | 5/2024 | Yi | H04L 61/4541 |
| 2003/0212822 A1* | 11/2003 | Saha | H04L 61/10 709/245 |
| 2014/0010150 A1* | 1/2014 | Agarwal | H04W 4/02 370/328 |
| 2018/0191666 A1* | 7/2018 | Rahman | H04L 61/4541 |
| 2018/0375732 A1* | 12/2018 | Kachalia | H04L 43/10 |
| 2019/0082020 A1* | 3/2019 | Lepp | H04L 67/561 |
| 2019/0230503 A1* | 7/2019 | Circosta | H04W 12/50 |
| 2020/0401357 A1* | 12/2020 | Hirakawa | G06F 3/1204 |
| 2021/0345231 A1* | 11/2021 | M M | H04L 67/51 |
| 2021/0392192 A1* | 12/2021 | Machikoppa | H04L 67/568 |

* cited by examiner

*Primary Examiner* — Younes Naji
(74) *Attorney, Agent, or Firm* — Fountainhead Law Group, PC

(57) ABSTRACT

Embodiments of the present disclosure include techniques for discovering services across networks based on a multicast domain name system (mDNS) protocol. An mDNS request for available services in a network is received from a client device. The client device belongs to a particular layer 2 (L2) domain. In response to receiving the mDNS request, a storage of the network device configured to store service records is queried to determine a set of available services. The set of available services is provided in a L2 domain different from the particular L2 domain. A response that includes the set of available services is generated. The response is sent to the client device.

20 Claims, 7 Drawing Sheets

500

510 Receiving from a client device a multicast domain name system (mDNS) request for available services in a network, wherein the client device belongs to a particular layer 2 (L2) domain

520 In response to receiving the mDNS request, querying a storage of the network device configured to store service records to determine a set of available services, wherein the set of available services is provided in a L2 domain different from the particular L2 domain

530 Generating a response that includes the set of available services

540 Sending the response to the client device

FIG. 5

DISCOVERING SERVICES ACROSS NETWORKS BASED ON A MULTICAST DOMAIN NAME SYSTEM PROTOCOL

BACKGROUND

Domain Name System (DNS) is a hierarchical and decentralized naming system used to identify computers, services, and other resources reachable through the Internet or other Internet Protocol (IP) networks. Information (e.g., resource records) contained in a DNS typically associate text-based identifiers (e.g., domain names) with other forms of information (e.g., IP addresses, service information, mail server information, nameserver information, etc.). DNS information is commonly used to map human-friendly domain names to the numerical IP addresses that computers need to locate services and devices using the underlying network protocols.

A multicast DNS (mDNS) protocol is generally used to resolve hostnames to IP addresses in a layer 2 (L2) domain without the need for a local name server. It is often referred to as a zero-configuration service that uses the same or similar programming interfaces, packet formats, and operating semantics as DNS. mDNS may operate as a stand-alone protocol or in conjunction with standard DNS servers.

The following detailed description and accompanying drawings provide a better understanding of the nature and advantages of various embodiments of the present disclosure.

BRIEF DESCRIPTION OF THE DRAWINGS

FIG. 5 illustrates a process for discovering services across networks based on an mDNS protocol according to some embodiments.

DETAILED DESCRIPTION

In the following description, for purposes of explanation, numerous examples and specific details are set forth in order to provide a thorough understanding of the present disclosure. It will be evident, however, to one skilled in the art that various embodiments of the present disclosure as defined by the claims may include some or all of the features in these examples alone or in combination with other features described below, and may further include modifications and equivalents of the features and concepts described herein.

Described herein are techniques for discovering services across networks based on a multicast domain name system (mDNS) protocol. The services of interest that an administrator wishes to make visible across layer 2 (L2) domains is configurable to help with security and scalability. In some embodiments, a network system includes an mDNS gateway, a set of client devices, and a set of service providers. The network system can be configured with several different L2 domains. Each client device can belong to one of the L2 domains. Similarly, each service provider may belong to one of the L2 domains. When a service provider boots up, the service provider announces the service(s) that it provides. The mDNS gateway caches a service record for each announced service that it receives from a service provider. This allows the mDNS gateway to respond to an mDNS request from a client device with services that are available in a different L2 domain from the L2 domain to which the client device belongs. In addition, utilizing the mDNS gateway in this fashion reduces the amount of multicast traffic in the network that would otherwise occur if mDNS requests are forwarded to different L2 domains.

Figure 1:
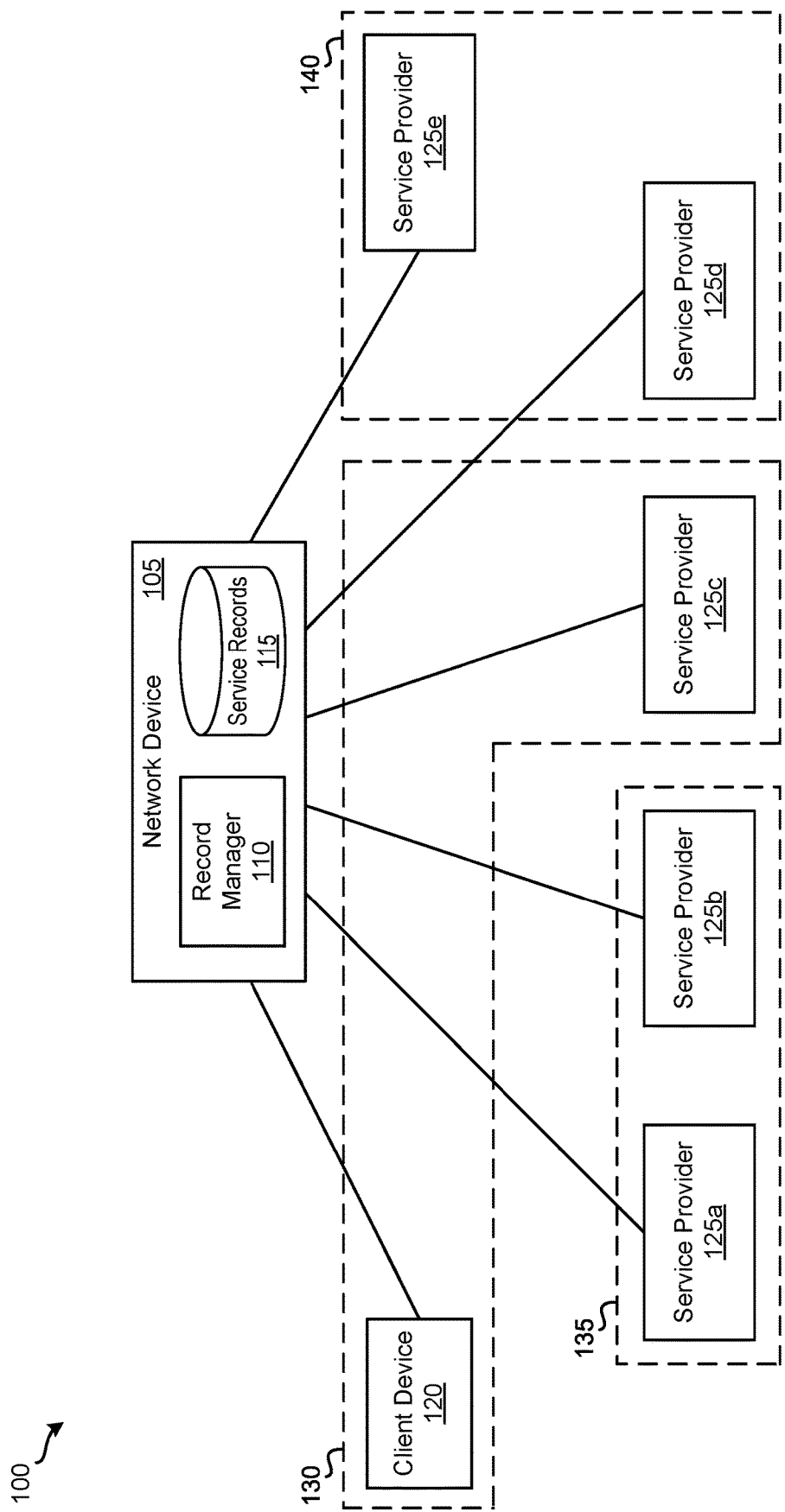
FIG. 1 illustrates a network system according to some embodiments.

FIG. 1 illustrates a network system 100 according to some embodiments. As shown, network system 100 includes network device 105, client device 120, and service providers 125*a-e*. Network device 105 can be directly or indirectly communicatively coupled to client device 120 and service providers 125*a-e*. In some embodiments, each of the client device 120 and service providers 125*a-e* may be a desktop computer, a laptop, a server computer, a cellphone, a smartphone, a wearable device, an activity tracker or manager, a tablet, a personal digital assistant (PDA), a media player, a printer or any other type of electronic device or combination thereof. For this example, client device 120 and service providers 125*a-e* belong to different L2 domains. Specifically, client device 120 and service provider 125*c* belong to L2 domain 130, service providers 125*a* and 125*b* belong to L2 domain 135, and service providers 125*d* and 125*e* belong to L2 domain 140. In some embodiments, a network element (e.g., network device 105, client device 120, a service provider 125, etc.) is a device that is part of one or more networks and is configured to communicate (e.g., data) with other network elements in the one or more networks. In some such embodiments, network elements that belong to the same L2 domain are configured with network addresses (e.g., IP addresses) in the same subnet. In other such embodiments, network elements that belong to the same L2 domain are part of the same L2 broadcast domain (e.g., each of the network elements can reach one another via L2 broadcast messages).

Client device 120 is configured to send data to, and receive data from, other network elements in network system 100. In this example, client device 120 may communicate with network device 105 and service provider 125*c*. As an example, client device 120 can send network device 105 an mDNS request for available services that specifies a link local multicast network address (e.g., an IP multicast address) as the destination network address of the request. In response to the request, client device 120 may receive a response from any network element belonging to the same L2 domain as client device 120 that responds to the mDNS request. For instance, client device 120 can receive, from service provider 125*c* via network device 105, a first response to the mDNS request indicating an available service provided by service provider 125*c*. In addition, client device may receive from network device 105, a second response to the mDNS request indicating services available in L2 domains different from the L2 domain to which client device 120 belongs. For example, the second response can include available services provided by service providers 125*a, b* in L2 domain 135 and/or service providers 125*d, e* in L2 domain 140. In some embodiments, client device 120 may use the information included in an mDNS response to connect to and use a service provided by a service provider 125*a-e*.

Each of the service providers 125a-e is responsible for providing one or more services in network system 100. Examples of services provided by a service provider can include a printer device providing printing services, a digital media player providing media playback services (e.g., playback of media on a display device connected to the digital media player), etc. In some cases, when a service provider 125 starts up, the service provider 125 announces the service(s) it is providing. For instance, the service provider 125 may broadcast, within the L2 domain to which the service provider 125 belongs, a service announcement that includes information associated with the service(s). Examples of service announcement information may include a hostname, an IP address, a port number, a type of service, service properties, service functionalities, etc. A service provider 125 can periodically receive a request for available services from network device 105, which is used to check the liveness of the services. In response to such a request, the service provider 125 sends network device 105 a response that includes service information associated with service(s) that the service provider 125 provides. In some instances, during the shutdown process of a service provider 125, the service provider 125 broadcasts, within the L2 domain to which the service provider 125 belongs, a message indicating that it is no longer providing its service(s).

In this example, network device 105 is configured to serve as an mDNS gateway. As illustrated in FIG. 1, network device 105 includes record manager 110 and service records storage 115. Service records storage 115 is a storage (e.g., a database) for storing service records. In some embodiments, a service record includes information associated with a service provided in network system 100 and a time-to-live (TTL) value for determining when to remove the service record from service records storage 115. Examples of service record information can include a name of a service, connection information for connecting to the service (e.g., a hostname, an IP address, a port number, a protocol, etc.), properties of the service, functions of the service, etc.

Record manager 110 is configured to manage service records for network device 105. For example, whenever network device 105 receives a service announcement from one of the service providers 125a-e, record manager 110 stores, in service records storage 115, a service record that includes the service information contained in the service announcement. Then, record manager 110 sets a TTL value for the service record (e.g., set a counter value to a defined value, a timestamp for a defined amount of time in the future, etc.). In some embodiments, the TTL value that record manager 110 sets for the service record is specified in the service announcement transmitted by the service provider 125. As another example, record manager 110 may manage service records stored in service records storage 115. For instance, if network device 105 receives from a service provider 125 a message indicating that the service provider 125 is no longer providing its service(s), record manager 110 deletes service record(s) associated with the service(s) from service records storage 115. Also, record manager 110 periodically checks whether any service records exist in service records storage 115 with an expired TTL value (e.g., a counter with a value of zero, a timestamp that is equal to or older than the current time, etc.). If so, record manager 110 deletes such service records from service records storage 115. In some embodiments, record manager 110 can refresh TTL values of service records by broadcasting, at defined intervals (e.g., once every thirty seconds, once a minute, once every five minutes, etc.) a request for available services to network elements in network system 100 (e.g., client device 120 and service providers 125a-e). Upon receiving a response to such a request from a network element (e.g., a service provider 125), record manager 110 resets the TTL value (e.g., reset a counter value to the defined value, reset a counter value to a value specified in the response, set a new timestamp for the defined amount of time in the future, set a new timestamp for a defined amount of time in the future specified in the response, etc.) of the service record associated with the network element.

Additionally, record manager 110 is responsible for handling mDNS requests for available services. For example, network device 105 can receive (e.g., from client device 120) an mDNS request for available services that specifies a multicast network address as the destination network address of the request. In response to the mDNS request, network device 105 sends the request to other network elements that belong to the same L2 domain as the requestor and forwards any responses from those network elements back to the requestor. Next, record manager 110 queries service records storage 115 for service records and sends them to the requestor. In this manner, network device 105 serves as a proxy that handles mDNS requests for services provided in different L2 domains.

In some embodiments, a tagging mechanism is provided that can be used to filter requests for service records. For instance, a service announcement broadcasted by a service provider 125 can include metadata associated with the service provider 125. When network device 105 receives such a service announcement, record manager 110 stores, in service records storage 115, a service record that includes the service information contained in the service announcement as well as the metadata associated with the service provider 125. This allows mDNS requests for available services to be filtered based on the metadata. As an example, the metadata associated with a service provider 125 can include a geographical location of the service provider 125. As such, the geographical location of a service provider 125 is stored in service records associated with the service provider 125. Now, a service requestor (e.g., client device 120) can send an mDNS request for available services filtered on the geographical location attribute (e.g., available services in California, available services in Las Vegas, available services in a particular building, available services in a particular floor of a building, etc.). Once network device 105 receives such a request, record manager 110 queries service records storage 115 for service records with a value for the geographical location attribute that matches a geographical location value specified in the mDNS request. With this tagging mechanism, service requestors are able to filter the results of a service query. While this example uses a geographical location attribute, one of ordinary skill in the art will appreciate that any number of additional and/or different metadata can be employed with this tagging mechanism. Furthermore, one of ordinary skill in the art will understand that the tagging mechanism may be applied to any attributes stored in service records (e.g., type of service, service functionalities, service properties, etc.).

Figure 2A:
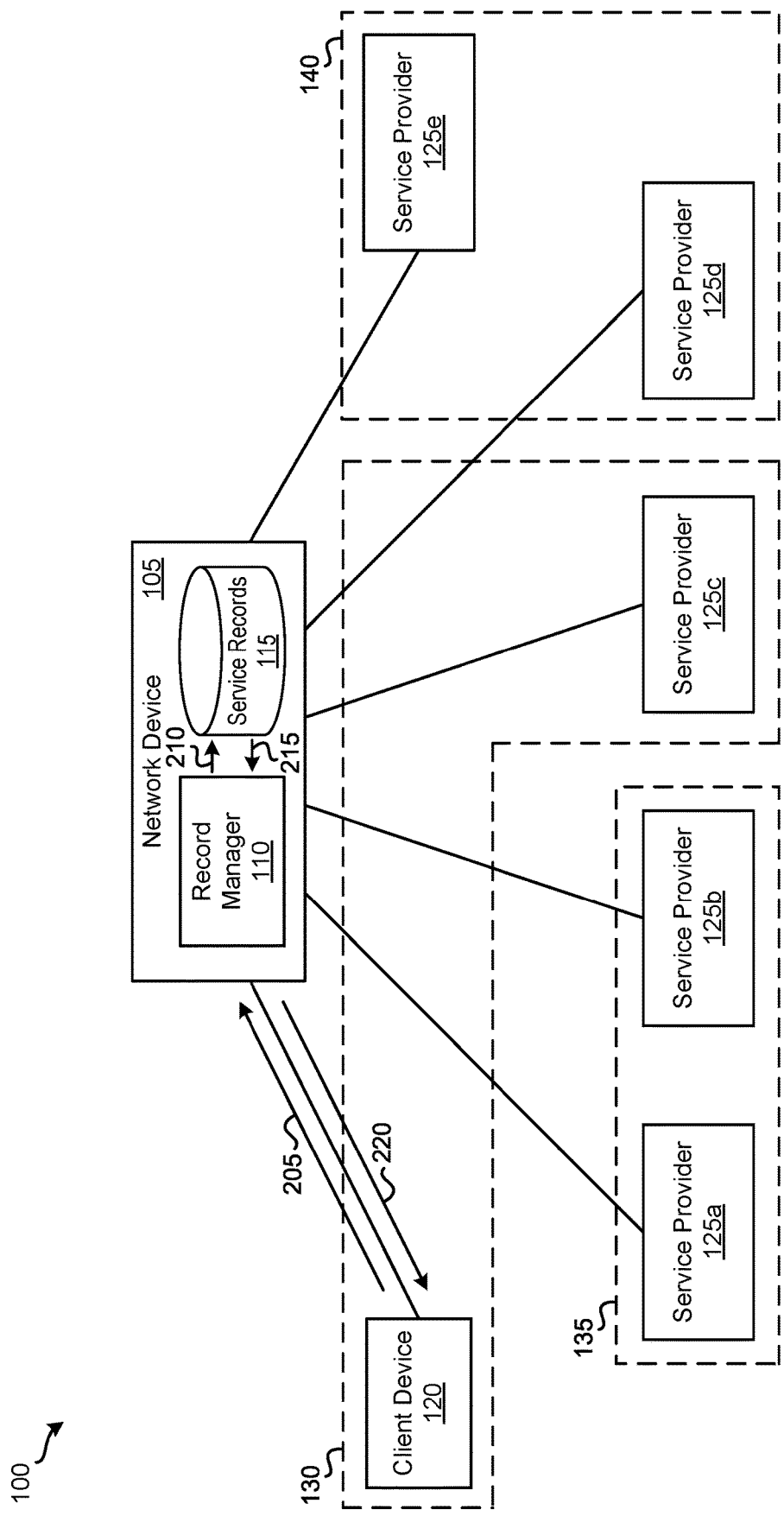
FIGS. 2A and 2B illustrate an example data flow of an mDNS request through the network system illustrated in FIG. 1 according to some embodiments.
Figure 2B:
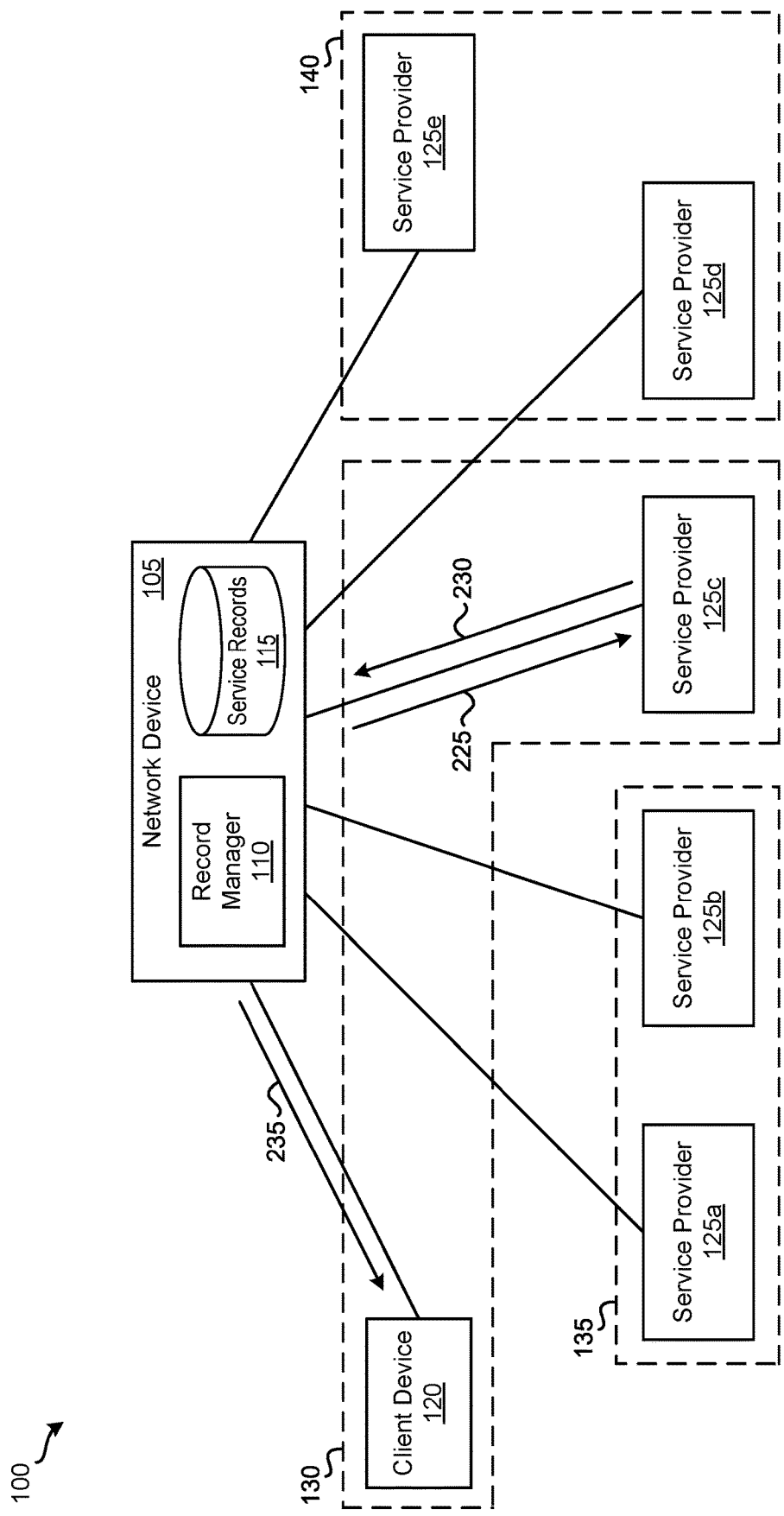

An example operation will now be described by reference to FIGS. 2A and 2B. In particular, FIGS. 2A and 2B illustrate an example data flow of an mDNS request through network system 100 according to some embodiments. In this example, each of the service providers 125a-e broadcasted a service announcement that includes information associated with the service(s) provided by the service provider 125. For each of the service announcements that network device 105 received, record manager 110 stored in service records storage 115 a service record that includes the service information contained in the service announcement. As such, service records storage 115 includes service records for all of the services provided by service providers 125a-e. In some cases, network device 105 may not receive a service announcement from a service provider 125 (e.g., the service provider 125 boots up before network device 105 is provisioned). In some such cases, network device 105 can discover services provided by the service provider 125 by broadcasting, at defined intervals a request for available services to network elements in network system 100.

As depicted in FIG. 2A, the example operation starts by client device 120 sending, at 205, an mDNS request for available services to network device 105. Here, the mDNS request specifies an IP multicast address for multicasting to the local subnet as the destination network address of the request. Once network device 105 receives the mDNS request, record manager 110 accesses, at 210, service records storage 115 to retrieve, at 215, service records of services available in a different L2 domain than the L2 domain to which client device 120 belongs. In some embodiments, record manager 110 retrieves such service records by determining that client device 120 belongs to L2 domain 130. Next, record manager 110 queries service records storage 115 for service records of services available in L2 domains other than L2 domain 130. In some embodiments, the L2 domains other than L2 domain 130 that are queried may be configurable. In this example, those L2 domains are L2 domains 135 and 140. Then, record manager 110 sends, at 220, the results of the query (i.e., service records of services available in L2 domains 135 and 140) to client device 120.

As mentioned above, the mDNS request in this example specifies an IP multicast address as the destination network address of the request. Thus, network device 105 forwards the mDNS request to network elements in the same subnet as client device 120. Referring now to FIG. 2B, FIG. 2B shows network device 105 forwarding, at 225, the mDNS request to service provider 125c since service provider 125c belongs to the same local subnet as client device 120. After receiving the mDNS request, service provider 125c sends, at 230, a response that includes service information about the service(s) provided by service provider 125c. Once network device 105 receives the response from service provider 125c, network device 105 forwards, at 235, it to client device 120.

Figure 3:
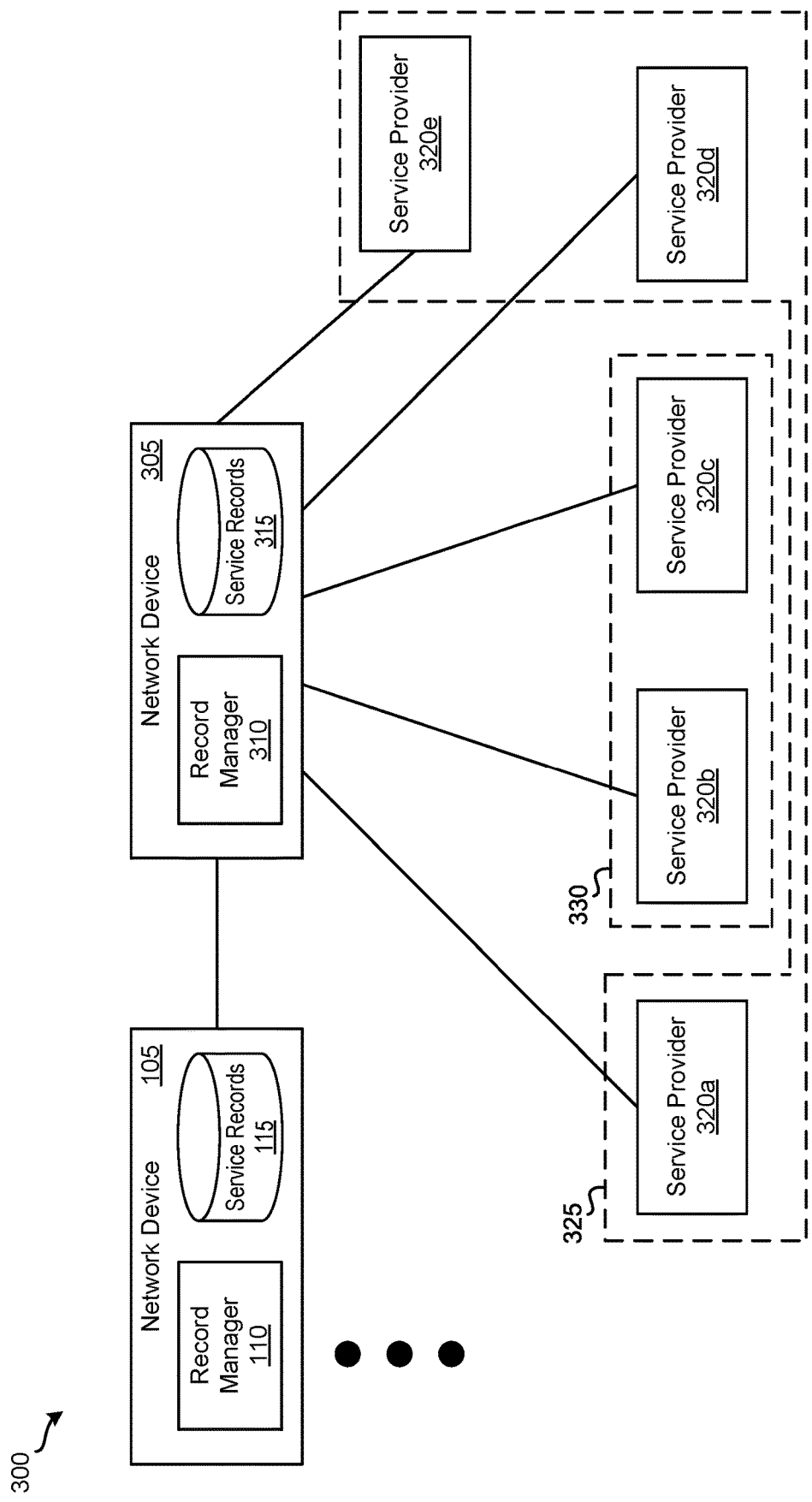
FIG. 3 illustrates a network system with a multiple mDNS gateway configuration according to some embodiments.

FIGS. 2A and 2B illustrate an example of a single mDNS gateway configuration. In some embodiments, a multiple mDNS gateway configuration may be employed to further discover services across different L2 domains. FIG. 3 illustrates a network system 300 with a multiple mDNS gateway configuration according to some embodiments. For this example, network system 300 includes network system 100 illustrated in FIG. 1 except network system 300 also includes network device 305 and service providers 320a-e. FIG. 3 only shows network device 105 from network system 100 for the purpose of simplicity. In this example, network device 305 is configured to also serve as an mDNS gateway. Network device 305 can be directly or indirectly communicatively coupled to service providers 320a-e. In some embodiments, each of the service providers 320a-e can be a desktop computer, a laptop, a server computer, a cellphone, a smartphone, a wearable device, an activity tracker or manager, a tablet, a PDA, a media player, a printer or any other type of electronic device or combination thereof. In this example, service providers 320a-e may belong to different L2 domains. As illustrated, service providers 320a, 320d, and 320e belong to L2 domain 325 while service providers 320b and 320c belong to L2 domain 330. Each of the L2 domains 325 and 330 can be part of one of the L2 domains 130, 135, 140 or be an L2 domain distinct from L2 domains 130, 135, 140. For this multi-mDNS gateway configuration, network device 105 is configured to manage client device 120, service providers 125a-e, and L2 domains 130, 135, 140. Network device 305 is configured to manage service providers 320a-e and L2 domains 325 and 330.

As shown in FIG. 3, network device 105 is communicatively coupled to network device 305. Here, the connection between network devices 105 and 305 is configured on network devices 105 and 305 as a connection between mDNS gateways. That is, the interface on network device 105 connected to network device 305 is configured to indicate that the interface is connected to another mDNS gateway. Similarly, the interface on network device 305 connected to network device 105 is configured to indicate that the interface is connected to another mDNS gateway. As depicted, network device 305 includes record manager 310 and service records storage 315. Record manager 310 is configured to operate with respect to service records storage 315 and service providers 320a-e in the same or similar manner as that described above by reference to record manager 110 operating with respect to service records storage 115 and service providers 125a-e. Even though network system 300 does not include a client device communicatively coupled to network device 305, network device 305 is configured to handle mDNS requests in the same or similar way as that described above by reference to network device 105.

Figure 4:
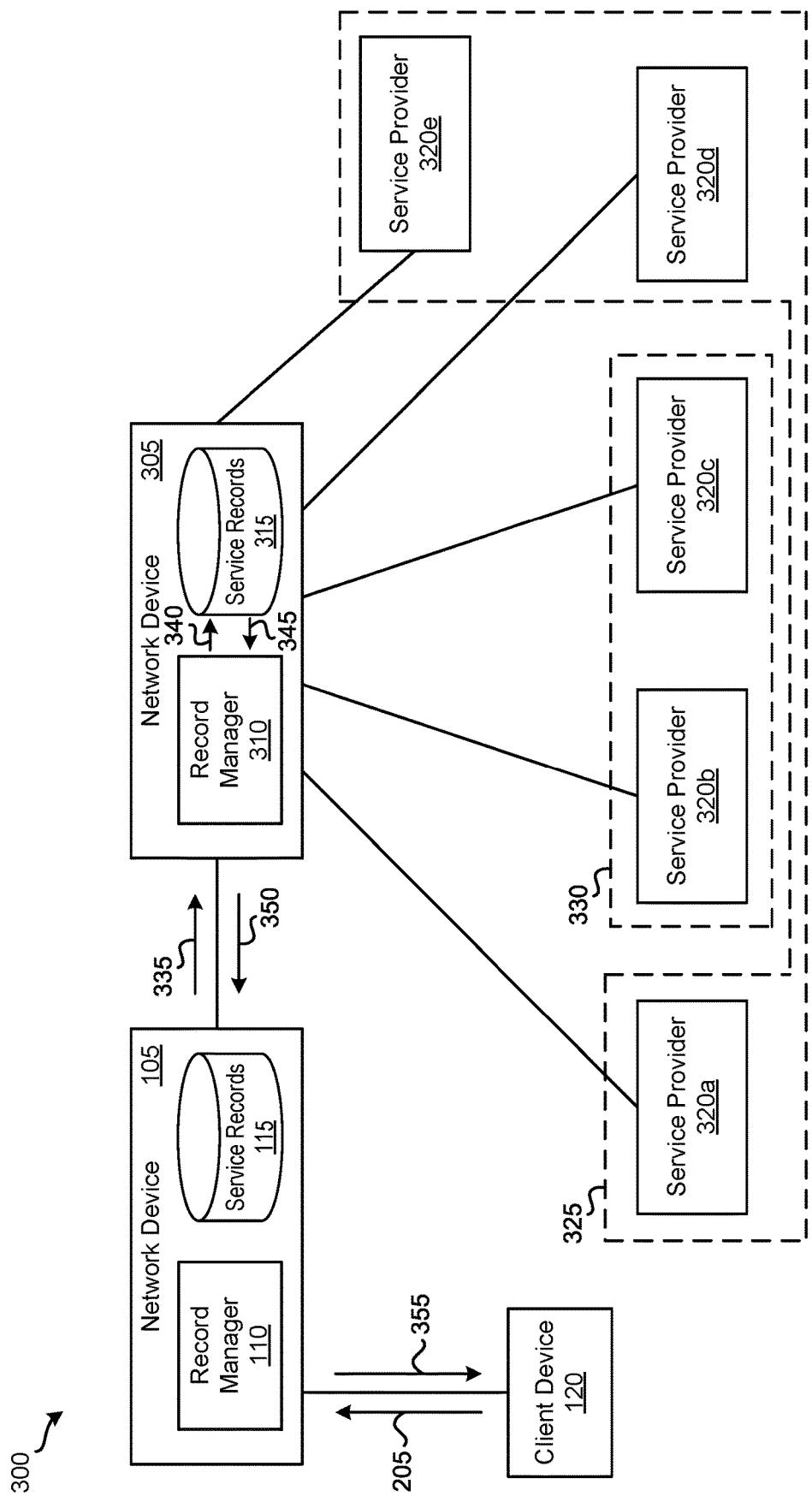
FIG. 4 illustrates an example data flow of the mDNS request illustrated in FIGS. 2A and 2B through the network system illustrated in FIG. 3 according to some embodiments.

In some embodiments, network device 305 may receive from network device 105 an mDNS request for available services. FIG. 4 illustrates an example data flow of the mDNS request illustrated in FIGS. 2A and 2B through network system 300 according to some embodiments. For this example, each of the service providers 320a-e broadcasted a service announcement that includes information associated with the service(s) provided by the service provider 320. For each of the service announcements that network device 305 received, record manager 310 stored in service records storage 315 a service record that includes the service information contained in the service announcement. Therefore, service records storage 315 includes service records for all of the services provided by service providers 320a-e.

FIG. 4 shows network device 105 performing additional operations in response to receiving, at 205, the mDNS request for available services from client device 120. Since network devices 105 and 305 are configured in a multiple mDNS configuration in this example, network device 105 forwards, at 335, the mDNS request to network device 305 via the configured connection between network devices 105 and 305. Additionally, network device 105 sends network device 305 a message indicating that the request is from client device 120 (e.g., an interface or port of network device 105 through which the mDNS request was received). Network device 105 may also send network device 305 a message indicating a set of L2 domains on which to search. In some embodiments, the mDNS request, the message indicating that the request is from client device 120, and the message indicating the set of L2 domains are included in a single message that network device 105 sends to network device 305. Once network device 305 receives the mDNS request, record manager 310 accesses, at 340, service records storage 315 to retrieve, at 345, service records of available services. In instances where network device 305 receives from network device 105 a set of L2 domains on which to search, network device 305 retrieves from service records storage 315 service records of available services that are provided in the set of L2 domains. Next, record manager 310 sends, at 350, the retrieved service records to network device 105. Record manager 310 also sends network device 105 a message indicating that the service records are to be sent to client device 120 (e.g., the interface or port of network device 105 through which the mDNS request was received). In some embodiments, the retrieved service records and the message indicating that the service records are to be sent to client device 120 are included in a single message that network device 305 sends to network device 105. In response to receiving the service records and the message, network device 105 forwards, at 355, the service records to client device 120 (e.g., forwarding the service records via the interface or port of network device 105 through which the mDNS request was received).

FIG. 4 shows how network device 105 handles an mDNS request from a requestor that network device 105 manages (e.g., client device 120). Network device 305 is configured to handle mDNS requests received from requestors to which network device 305 is connected in the same way. That is, network device 305 would respond to the mDNS request, forward the request to other network elements in the same L2 domain as the requestor, forward responses from these other network elements to the requestor, forward the request to network device 105 for processing, and forward the response from network device 105 to the requestor. Although FIGS. 3 and 4 show a configuration with two mDNS gateways, one of ordinary skill in the art will realize that the technique demonstrated in FIGS. 3 and 4 can be applied to configurations with any number of mDNS gateways connected to each other in any number of different ways.

FIG. 5 illustrates a process 500 for discovering services across networks based on an mDNS protocol according to some embodiments. In some embodiments, an mDNS gateway (e.g., network device 105 or network device 305) performs process 500. Process 500 starts by receiving, at 510, from a client device an mDNS request for available services in a network. The client device belongs to a particular L2 domain. Referring to FIG. 2A as an example, network device 105 may receive from client device 120 an mDNS request for available services in network system 100.

In response to receiving the mDNS request, process 500 queries, at 520, a storage of the network device configured to store service records to determine a set of available services. The set of available services is provided in a L2 domain different from the particular L2 domain. Referring to FIG. 2A as an example, record manager 110 can query service records storage 115 to determine a set of service records of available services.

Process 500 then generates, at 530, a response that includes the set of available services. Referring to FIG. 2A as an example, record manager 110 generates a response to the mDNS request that includes the set of service records of available services. Finally, process 500 sends, at 540, the response to the client device. Referring to FIG. 2A as an example, network device 105 sends client device 120 the response to the mDNS request.

Figure 6:
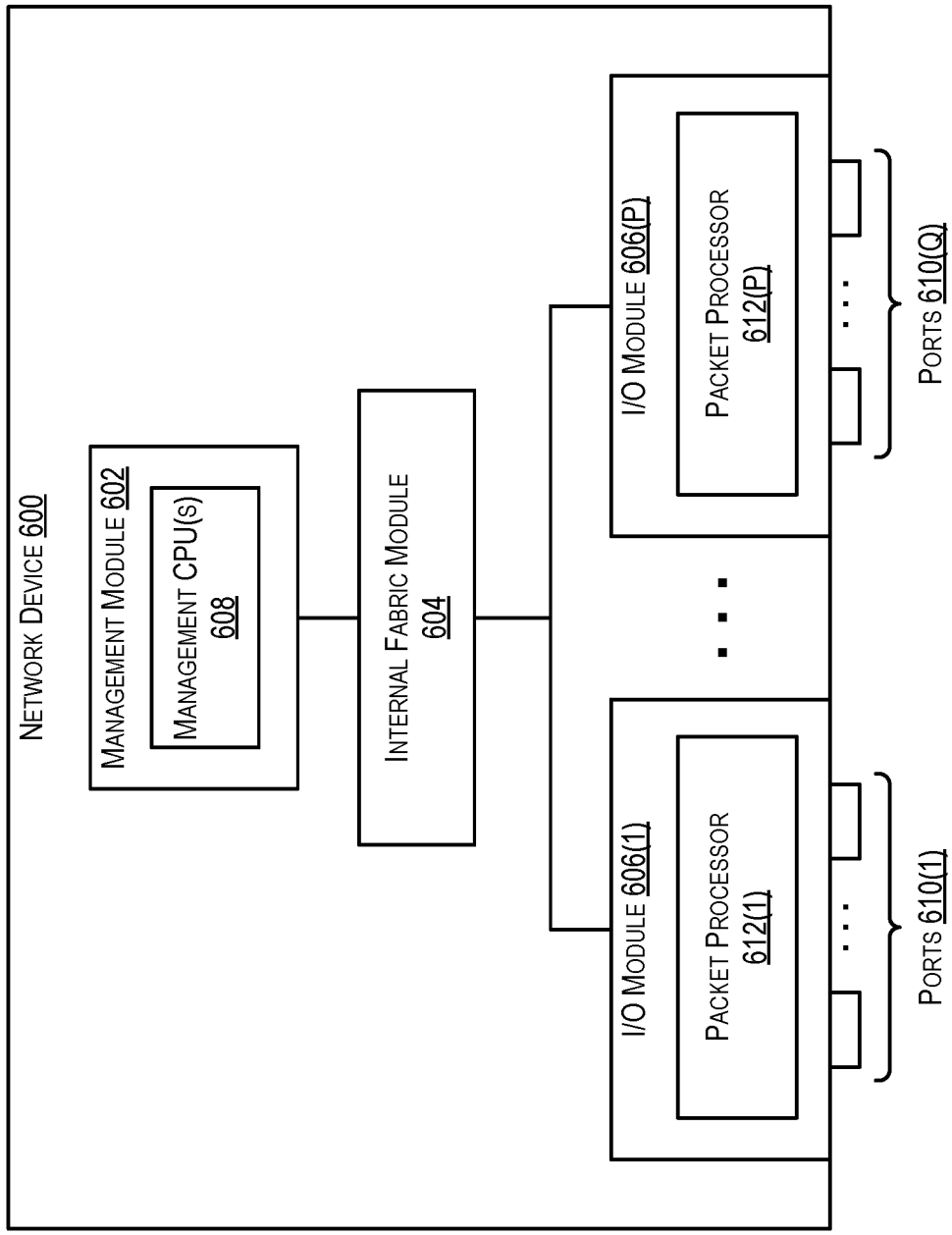
FIG. 6 illustrates an example network device according to some embodiments.

FIG. 6 illustrates the architecture of an example network device (e.g., a network switch or router) 600 that may implement the techniques of the present disclosure according to certain embodiments. For example, network device 600 may correspond to network device 105 shown in FIG. 1 and network device 305 shown in FIG. 3.

Network device 600 includes a management module 602, an internal fabric module 604, and a number of I/O modules 606(1)-(P). Management module 602 includes one or more management CPUs 608 for managing/controlling the operation of the device. Each management CPU 608 can be a general-purpose processor, such as an Intel/AMD x86 or ARM-based processor, that operates under the control of program code maintained in an associated volatile memory and/or stored in a non-transitory computer readable storage medium (not shown). In one set of embodiments, this program code can include code for implementing some or all of the techniques described in the foregoing sections.

Internal fabric module 604 and I/O modules 606(1)-(P) collectively represent the data, or forwarding, plane of network device 600. Internal fabric module 604 is configured to interconnect the various other modules of network device 600. Each I/O module 606 includes one or more input/output ports 610(1)-(Q) that are used by network device 600 to send and receive network packets. Each I/O module 606 can also include a packet processor 612, which is a hardware processing component that can make wire speed decisions on how to handle incoming or outgoing network packets.

It should be appreciated that network device 600 is illustrative and other configurations having more or fewer components than network device 600 are possible.

The following are some example embodiments of the present disclosure. In some embodiments, a method is executable by a network device. The method comprises receiving from a client device a multicast domain name system (mDNS) request for available services in a network, wherein the client device belongs to a particular layer 2 (L2) domain; in response to receiving the mDNS request, querying a storage of the network device configured to store service records to determine a set of available services, wherein the set of available services is provided in a L2 domain different from the particular L2 domain; generating a response that includes the set of available services; and sending the response to the client device.

In some embodiments, the network device is a first network device and the response is a first response. The present disclosure further comprises forwarding the mDNS request to a second network device; receiving, from the second network device, a second response that includes a second set of available services provided in L2 domains managed by the second device; and forwarding the second response to the client device.

In some embodiments, the network device is a first network device, the mDNS request is a first mDNS request, and the set of available services is a first set of available services. The present disclosure further comprises receiving, from a second network device, a second request for services available in the network; in response to receiving the second request, determining a second set of available services; generating a response that includes the second set of available services; and sending the response to the second network device.

In some embodiments, the present disclosure further comprises receiving, from a service provider, a service announcement comprising information associated with a service provided by the service provider; and in response to receiving the service announcement, storing a service record in the storage, the service record comprising the information associated with the service provided by the service provider.

In some embodiments, the present disclosure further comprises periodically sending the service provider a request for available services.

In some embodiments, the service record further comprises a time to live value. Storing the service record in the storage comprises setting the time to live value to a first defined value.

In some embodiments, the response is a first response. The present disclosure further comprises receiving, from the service provider, a second response to the request; and in response to receiving the second response, resetting the time to live value of the service record to a second defined value.

In some embodiments, each service record stored in the storage comprises metadata associated with a particular service provider. The mDNS request includes a filter. Querying the storage of the network device configured to store service records to determine the set of available services comprises applying the filter on the metadata of each service record stored in the storage.

In some embodiments, the metadata associated with the particular service provider in each service record comprises a geographical location attribute for storing a location of the service provider.

In some embodiments, a non-transitory machine-readable medium stores a program executable by at least one processing unit of a network device. The program comprising instructions for receiving from a client device a request for available services in a network, wherein the client device belongs to a particular layer 2 (L2) domain; in response to receiving the request, determining a set of available services, wherein the set of available services is provided in a L2 domain different from the particular L2 domain; generating a response that includes the set of available services; and sending the response to the client device.

In some embodiments, a network device comprises a processing unit and a non-transitory machine-readable medium storing instructions. The instructions cause the processing unit to, upon receiving from a client device a multicast domain name system (mDNS) request for available services in a network, wherein the client device belongs to a particular layer 2 (L2) domain; query a storage of the network device configured to store service records to determine a set of available services, wherein the set of available services is provided in a L2 domain different from the particular L2 domain; generate a response that includes the set of available services; and send the response to the client device.

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations, and equivalents will be evident to those skilled in the art and may be employed without departing from the spirit and scope of the disclosure as defined by the claims.

What is claimed is:

1. A method executable by a first network device, the method comprising:
receiving from a client device a first multicast domain name system (mDNS) request for available services in a network filtered on a tagged attribute, wherein the client device belongs to a first layer 2 (L2) domain;
in response to receiving the first mDNS request, querying a first storage of the first network device for a first set of service records of a first set of available services with a value for the tagged attribute that matches a tagged value specified in the first mDNS request, wherein the first storage comprises the first set of service records of the first set of available services, wherein the first set of available services is provided in a second L2 domain different from the first L2 domain;
generating a first response that includes the first set of available services;
sending the first response to the client device;
forwarding the first mDNS request to a second network device, wherein the second network device queries a second storage of the second network device, wherein the second storage comprises a second set of service records of a second set of available services, wherein the second set of available services is provided in a third L2 domain different from the first and second L2 domains;
receiving a second response from the second network device, wherein the second response is generated by the second network device based on the query of the second storage, wherein the second response includes the second set of available services provided in the third L2 domain; and
forwarding the second response to the client device,
wherein the first network device is a first mDNS gateway configured to receive and process a first set of mDNS requests for services provided in the first and second L2 domains and the second network device is a second mDNS gateway is configured to receive and process a second set of mDNS requests for services in the third L2 domain.

2. The method of claim 1, wherein the first storage further comprises a third set of service records of a third set of available services, wherein each service in the third set of available services is provided in an L2 domain managed by the first network device, the method further comprising:
receiving, from a third network device, a second mDNS request for available services in the network;
in response to receiving the second mDNS request, querying the first storage of the first network device;
generating a third response that includes the third set of available services; and
sending the third response to the third network device.

3. The method of claim 1 further comprising:
receiving, from a service provider, a service announcement comprising information associated with a service provided by the service provider; and
in response to receiving the service announcement, storing a service record in the first storage of the first network device, the service record comprising the information associated with the service provided by the service provider.

4. The method of claim 3 further comprising periodically sending the service provider a service request for available services.

5. The method of claim 4, wherein the service record further comprises a time to live value, wherein storing the service record in the first storage of the first network device comprises setting the time to live value to a first defined value.

6. The method of claim 5 further comprising:
receiving, from the service provider, a second response to the service request; and
in response to receiving the second response, resetting the time to live value of the service record to a second defined value.

7. The method of claim 1, wherein each service record stored in the first storage of the first network device comprises metadata associated with a particular service provider, wherein the first mDNS request includes a filter, wherein querying the first storage of the first network device comprises applying the filter on the metadata of each service record stored in the first storage of the first network device.

8. The method of claim 7, wherein the metadata associated with the particular service provider in each service record comprises a geographical location attribute for storing a location of the service provider.

9. A non-transitory machine-readable medium storing a program executable by at least one processing unit of a first network device, the program comprising instructions for:
   receiving from a client device a first multicast domain name system (mDNS) request for available services in a network filtered on a tagged attribute, wherein the client device belongs to a first layer 2 (L2) domain;
   in response to receiving the first mDNS request, querying a first storage of the first network device for a first set of service records of a first set of available services with a value for the tagged attribute that matches a tagged value specified in the first mDNS request, wherein the first storage comprises the first set of service records of the first set of available services, wherein the first set of available services is provided in a second L2 domain different from the first L2 domain;
   generating a first response that includes the first set of available services; and
   sending the first response to the client device;
   forwarding the first mDNS request to a second network device, wherein the second network device queries a second storage of the second network device, wherein the second storage comprises a second set of service records of a second set of available services, wherein the second set of available services is provided in a third L2 domain different from the first and second L2 domains;
   receiving a second response from the second network device, wherein the second response is generated by the second network device based on the query of the second storage, wherein the second response includes the second set of available services provided in the third L2 domain; and
   forwarding the second response to the client device,
   wherein the first network device is a first mDNS gateway configured to receive and process a first set of mDNS requests for services provided in the first and second L2 domains and the second network device is a second mDNS gateway is configured to receive and process a second set of mDNS requests for services in the third L2 domain.

10. The non-transitory machine-readable medium of claim 9, wherein the first storage further comprises a third set service records of a third set of available services, wherein each service in the third set of available services is provided in an L2 domain managed by the first network device, wherein the program further comprises instructions for:
   receiving, from a third network device, a second request for available services in the network;
   in response to receiving the second request, querying the first storage of the first network device;
   generating a third response that includes the third set of available services; and
   sending the third response to the third network device.

11. The non-transitory machine-readable medium of claim 9, wherein the program further comprises instructions for:
   receiving, from a service provider, a service announcement comprising information associated with a service provided by the service provider; and
   in response to receiving the service announcement, storing a service record in the first storage of the first network device, the service record comprising the information associated with the service provided by the service provider.

12. The non-transitory machine-readable medium of claim 9, wherein each service record stored in the first storage of the first network device comprises metadata associated with a particular service provider, wherein the first mDNS request includes a filter, wherein querying the first storage of the first network device comprises applying the filter on the metadata of each service record stored in the first storage of the first network device.

13. The non-transitory machine-readable medium of claim 12, wherein the metadata associated with the particular service provider in each service record comprises a geographical location attribute for storing a location of the service provider.

14. A first network device comprising:
   at least one processing unit; and
   a non-transitory machine-readable medium storing instructions that when executed by the at least one processing unit cause the at least one processing unit to:
   upon receiving from a client device a first multicast domain name system (mDNS) request for available services in a network filtered on a tagged attribute, query a first storage of the first network device for a first set of service records of a first set of available services with a value for the tagged attribute that matches a tagged value specified in the first mDNS request, wherein the client device belongs to a first layer 2 (L2) domain, wherein the first storage comprises the first set of service records of the first set of available services and wherein the first set of available services is provided in a second L2 domain different from the first L2 domain;
   generate a first response that includes the first set of available services; and
   send the first response to the client device;
   forward the first mDNS request to a second network device, wherein the second network device queries a second storage of the second network device, wherein the second storage comprises a second set of service records of a second set of available services, wherein the second set of available services is provided in a third L2 domain different from the first and second L2 domains;
   receive a second response from the second network device, wherein the second response is generated by the second network device based on the query of the second storage, wherein the second response includes the second set of available services provided in the third L2 domain; and
   forward the second response to the client device,
   wherein the first network device is a first mDNS gateway configured to receive and process a first set of mDNS requests for services provided in the first and second L2 domains and the second network device is a second mDNS gateway is configured to receive and process a second set of mDNS requests for services in the third L2 domain.

15. The first network device of claim 14, wherein the instructions further cause the processing unit to:

receive, from a service provider, a service announcement comprising information associated with a service provided by the service provider;

in response to receiving the service announcement, store a service record in the first storage of the first network device, the service record comprising the information associated with the service provided by the service provider; and periodically send the service provider a service request for available services.

16. The first network device of claim 15, wherein the service record further comprises a time to live value, wherein storing the service record in the first storage of the first network device comprises setting the time to live value to a first defined value.

17. The first network device of claim 16, wherein the instructions further cause the processing unit to:

receive, from the service provider, a second response to the service request; and in response to receiving the second response, reset the time to live value of the service record to a second defined value.

18. The first network device of claim 14, wherein each service record stored in the first storage of the first network device comprises metadata associated with a particular service provider, wherein the first mDNS request includes a filter, wherein querying the first storage of the first network device comprises applying the filter on the metadata of each service record stored in the first storage of the first network device.

19. The first network device of claim 18, wherein the metadata associated with the particular service provider in each service record comprises a geographical location attribute for storing a location of the service provider.

20. The first network device of claim 17, wherein the instructions further cause the processing unit to:

receive, from the service provider, a second response to the service request; and in response to receiving the second response, reset the time to live value of the service record to a second defined value.

\* \* \* \* \*